United States Patent [19]

Lien

[11] Patent Number: 5,146,678
[45] Date of Patent: Sep. 15, 1992

[54] PROCESS FOR ELECTRICALLY CONNECTING AN END OF A POWER CABLE TO A CABLE SPLICE

[75] Inventor: Wayne W. Lien, Waukesha, Wis.

[73] Assignee: Cooper Power Systems, Inc., Houston, Tex.

[21] Appl. No.: 723,844

[22] Filed: Jul. 1, 1991

Related U.S. Application Data

[62] Division of Ser. No. 383,934, Jul. 21, 1989, Pat. No. 5,041,027.

[51] Int. Cl.$^5$ .................. H02G 15/08; B23P 19/04
[52] U.S. Cl. .................................. 29/857; 29/869; 29/873
[58] Field of Search .................. 29/857, 869, 870, 871, 29/872, 873, 237, 282; 174/84 R, 84 S; 439/593, 723, 724, 796, 797, 798, 843, 846, 848

[56] References Cited

U.S. PATENT DOCUMENTS

| | | | |
|---|---|---|---|
| 1,975,885 | 10/1934 | Wellman | 173/363 |
| 2,297,336 | 9/1942 | White | 173/328 |
| 2,342,711 | 2/1944 | Wade | 173/328 |
| 2,399,312 | 4/1946 | Augustine | 254/1 |
| 2,999,223 | 9/1961 | Peter | 339/205 |
| 3,372,476 | 3/1968 | Peiffer et al. | 29/869 X |
| 3,383,642 | 5/1968 | Nava et al. | 339/205 |
| 3,717,717 | 2/1973 | Cunningham et al. | 174/73 |
| 3,816,639 | 6/1974 | Anderson et al. | 174/73 |
| 3,864,013 | 2/1975 | Levy | 339/272 |
| 3,927,457 | 12/1975 | Bickle | 29/237 |
| 4,501,055 | 2/1985 | George | 29/237 |

*Primary Examiner*—Timothy V. Eley
*Attorney, Agent, or Firm*—Michael, Best & Friedrich

[57] ABSTRACT

A system for electrically connecting a first power cable end to a second power cable end, the system including a first probe adapted to be electrically connected to the first power cable end, a second probe adapted to be electrically connected to the second power cable end, and a cable splice including a first female contact assembly adapted to engage, in electrically connection therewith, the first probe, and a second female contact assembly electrically connected to the first female contact assembly and adapted to engage, in electrical connection therewith, the second probe.

4 Claims, 3 Drawing Sheets

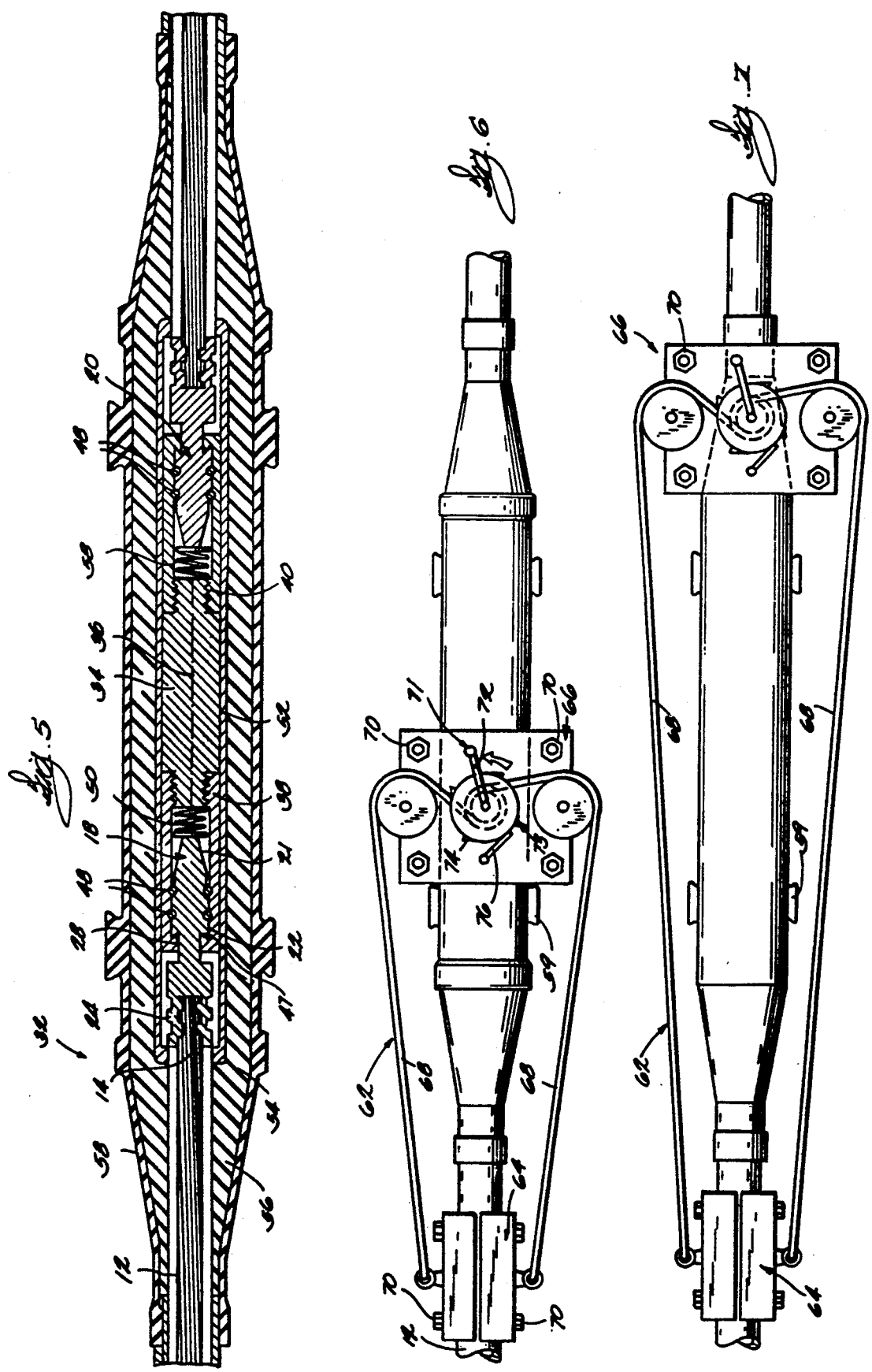

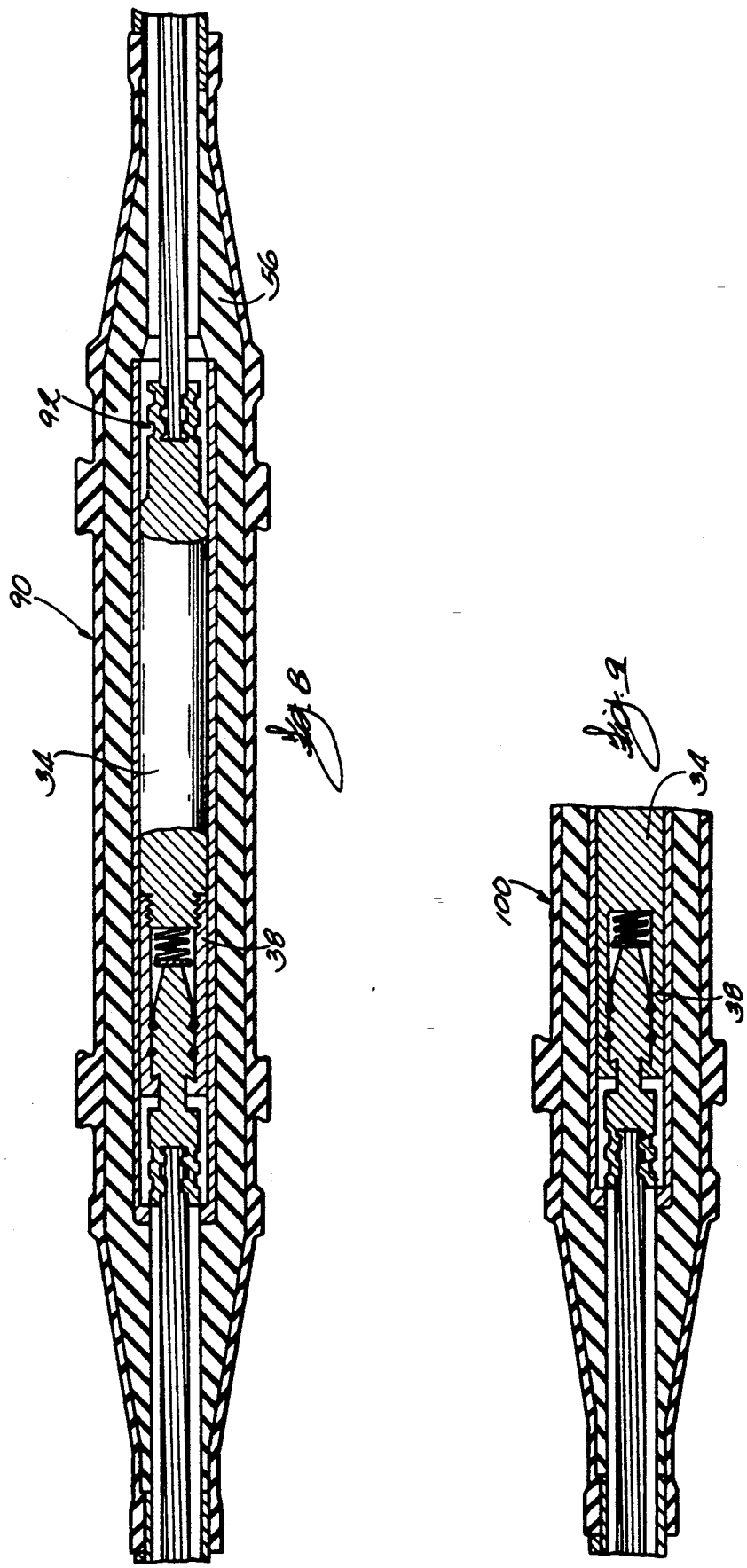

PROCESS FOR ELECTRICALLY CONNECTING AN END OF A POWER CABLE TO A CABLE SPLICE

This is a division of application Ser. No. 383,934, filed Jul. 21, 1989, now U.S. Pat. No. 5,041,027.

BACKGROUND OF THE INVENTION

The invention relates, in general, to electrical cables, and, more particularly, to systems for repairing damaged cables, such as damaged underground power cables.

Cables, such as underground power cables, must be repaired when they are damaged by digging, for example Prior art cable splicing devices in common use consist of a rubber insulating and voltage grading piece, and a crimp connector. When using such a prior art splice to electrically connect a first cable end to a second cable end, the rubber piece is slid over the first cable end, the first and second cable ends are crimped to first and second ends, respectively, of the crimp connector to form a splice area, and the rubber piece is then slid over the splice area.

One of the operative requirements of these prior art devices is that the rubber piece must tightly fit over the splice area for proper electrical insulation integrity and for watertightness. This tightness requirement causes difficulty in sliding the rubber piece from the first cable to over the splice area. The greater the length of the splice area, the further the rubber piece must be moved to cover the splice area, and consequently the greater the difficulty in joining the first cable end to the second cable end. When small sections of underground cable (three inches to a foot) are damaged by digging, it is customary to remove about four feet of cable in order to install two splices with an intermediate portion of cable therebetween. A single long splice is not used due to the difficulty in sliding a long rubber piece over a long splice area. Another problem associated with these prior art splicing devices is that rubber pieces of differing interior diameter are required for use with different diameter cable ends.

While the prior art includes several low power connectors, such as audio jacks, these would not be useful in high power applications due to a lack of proper voltage grading and insufficient current interchange areas. Further, these connectors would not be useful in underground applications as they are not watertight.

SUMMARY OF THE INVENTION

The invention provides a cable splice comprising an elongated, generally solid, electrically conductive bus having opposite ends, and a female contact assembly connected to each of the opposite ends of the conductive bus.

The invention also provides a cable splice which is adapted to have a probe inserted therein, the splice comprising an elongated, generally conductive bus having a longitudinal axis and opposite ends, and a female contact assembly connected to each of the opposite ends of the conductive bus. Each female contact assembly includes contact fingers oriented generally parallel to and spaced radially outwardly from the axis, and resilient means surrounding the contact fingers for allowing the contact fingers to be moved radially outwardly upon insertion of the probe into the contact assembly and for exerting radially inward pressure on the contact fingers to cause intimate contact between the contact fingers and the probe.

The invention also provides a cable splice comprising a female contact assembly having an axis and including means for permitting insertion of a probe into the contact assembly and along the axis and for preventing removal of the probe from the contact assembly, the means including a surface extending transversely to the axis. The splice also comprises means for biasing the probe in the direction opposite to the direction of insertion and into engagement with the surface.

The invention also provides a system for electrically connecting a first power cable end to a second power cable end, the system including a first probe adapted to be electrically connected to the first power cable end, a second probe adapted to be electrically connected to the second power cable end, and a cable splice including a first female contact assembly adapted to engage, in electrical connection therewith, the first probe, and a second female contact assembly electrically connected to the first female contact assembly and adapted to engage, in electrical connection therewith, the second probe.

The invention also provides an assembly comprising a probe having a rearward portion adapted to be connected to a power cable, and a rearwardly facing surface located forwardly of the rearward portion and having therein an undercut. The assembly also comprises a cable splice including a female contact assembly including means for permitting insertion of the probe into the contact assembly and for preventing removal of the probe from the contact assembly, the means including a radially outwardly movable, radially outwardly located contact portion, and a projection extending radially inwardly from the contact portion, the projection being movable radially outwardly with the contact portion during insertion of the probe into the female contact assembly, movable radially inwardly after insertion of the probe into the female contact assembly, and extending into the undercut in response to movement of the probe relative to the contact assembly in the direction of removal, so as to prevent radially outward movement of the contact portion.

The invention also provides a probe for allowing an end of a power cable to be electrically connected to a cable splice, the probe comprising an aluminum connector portion adapted to be crimped to the cable, and a copper contact surface fixed to the aluminum connector portion and adapted to be electrically connected to the cable splice.

The invention also provides a process for electrically connecting an end of a power cable to the female contact assembly of a cable splice, the process comprising the steps of electrically connecting a probe to the end of the power cable, and inserting the probe into the female contact assembly of the cable splice.

Other features and advantages of the invention will become apparent to those skilled in the art upon review of the following detailed description of the preferred embodiment of the invention, reference being made to the appended drawings.

BRIEF DESCRIPTION OF THE VIEWS OF THE DRAWINGS

FIG. 5 is a sectional view of the complete cable splice assembly with probes latched at both ends of the splice.

FIGS. 6 and 7 show an apparatus for moving the probe through the positions shown in FIGS. 2–5.

FIGS. 8 and 9 are sectional views of cable splices which are alternatives to the cable splice shown in FIGS. 1–5.

Figure 1:
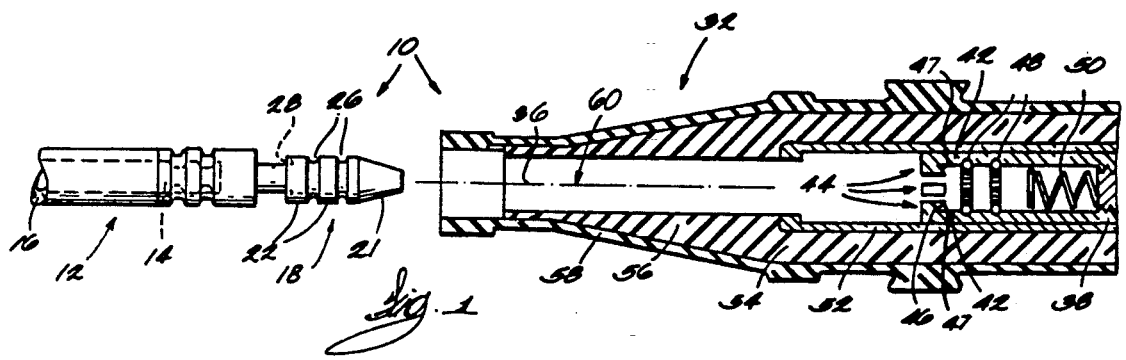
FIG. 1 is a sectional view of a portion of a cable splice assembly embodying the invention and including a cable splice and a probe positioned to be inserted into the cable splice.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

A cable splice assembly or system 10 embodying various of the features of the invention is shown in the drawings. The splice assembly 10 can be used to splice together ends of cable 12, which ends could be produced when a cable is severed The cable 12 typically includes an aluminum conductor 14 surrounded by insulation 16. Only one end of the cable 12 is shown in FIG. 1. Before the splice assembly 10 is used, the ends of the cable 12 are stripped of their insulation 16 to expose the conductor 14.

The splice assembly comprises probes 18 and 20. The probes 18 and 20 are substantially identical, and only the probe 18 will be described in detail. The probe 18 includes a forward tapered portion 21 including a contact surface 22, and a permanent compression connector or rearward portion 24 (see FIG. 2) adapted to be crimped onto one end of cable 12. In the preferred embodiment of the invention, the contact surface 22 is made of copper, the permanent compression connector portion 24 is made of aluminum, and the copper contact surface 22 and the aluminum connector portion 24 are joined by compression welding. This allows an aluminum to aluminum connection between the conductor 14 and the probe 18. In alternative embodiments, the probe 18 could be either completely or partially formed of aluminum or copper. The probe 18 of the preferred embodiment of the invention includes grooves 26 for a purpose that will later be described. The probe 18 further includes an annular, rearwardly facing surface which is located forwardly of the connector portion 24 and which has therein an annular undercut 28 for a purpose that will later be described.

The splice assembly 10 further comprises a cable splice 32 partially shown in FIGS. 1 through 4 and completely shown in FIG. 5.

The cable splice 32 includes a bus 34 (see FIG. 5) of suitable length, for example one foot. The bus 34 is elongated along a longitudinal axis 36 and has opposite ends. In the preferred embodiment of the invention, the bus 34 is made of solid copper.

The cable splice 32 also includes a female contact assembly 38 connected to one end of the bus 34. In the preferred embodiment of the invention, a second female contact assembly 40 is connected to the other end of the bus 34 (see FIG. 5).

Each female contact assembly 38 or 40 is adapted to receive, radially interior thereto and in electrical connection therewith, one of the probes 18 or 20, forward tapered portion first. In the preferred embodiment, the female contact assemblies 38 and 40 are made of copper. This allows a copper to copper connection between the probe 18 or 20 and the female contact assembly 38 or 40. Copper is used in the preferred embodiment to avoid oxidization problems associated with aluminum. Also in the preferred embodiment, the female contact assemblies 38 and 40 are threadedly connected to the bus 34. However, it is envisioned that materials other than copper, such as aluminum, could be used and that other methods of connecting either of the female contact assemblies 38 and 40 to the bus 34 could be employed.

The second female contact assembly 40 is substantially identical to the female contact assembly 38, and only the female contact assembly 38 will be described in detail. As the probes 18 and 20 are also substantially identical, description of the cable splice 32 will be made with reference to only the probe 18.

The female contact assembly 38 includes a radially outwardly located contact portion 42 which is radially outwardly movable with respect to the longitudinal axis 36. The contact portion 42 is preferably defined by a plurality of contact fingers 44. More particularly, the female contact assembly 38 of the preferred embodiment includes four fingers 44 that are oriented generally parallel to the axis 36, are spaced radially outwardly from the axis 36, and are angularly spaced about the axis 36.

The female contact assembly 38 also includes means on the contact portion 42 of the female contact assembly 38 for preventing removal of the probe 18 from the female contact assembly 38 after the probe is inserted into the female contact assembly. More particularly, this means comprises at least one projection 46 extending radially inwardly from the contact portion 42 and having thereon a surface 47 extending generally transversely of the axis 36. In the preferred embodiment, each contact finger 44 includes a projection 46.

The projections 46 are movable in the radially outward direction upon the exertion thereon, by the probe 18, of radially outward pressure during insertion of the probe 18 into the female contact assembly 38. As will later be explained in greater detail, the projections 46 are adapted to recoil radially inwardly after the probe 18 has been inserted therepast, the projections thereby preventing removal of the probe 18 from the female contact assembly 38. In the preferred embodiment, the projections 46, and particularly the surfaces 47, generally point in the direction of insertion of the probe 18.

The female contact assembly 38 optionally includes a plurality of garter spring current interchanges or Multi-Lam (trademark) interchanges 48 for engagement with the grooves 26 of the probe 18, after insertion of the probe 18 into the female contact assembly 38.

A spring 50 is provided for biasing the probe 18 in the direction opposite the direction in which the probe is inserted into the female contact assembly 38, and for biasing the projections 46 into the undercut 28 of the probe 20, after the probe is inserted into the female contact assembly 38. If the probe 18 is not completely inserted into the contact assembly 38, the spring 50 will cause the probe 18 to move in the direction opposite the direction of insertion by an amount sufficient to provide a visual indication that the probe 18 has not been non-releasably engaged by the female contact assembly 38.

The cable splice 32 further includes, surrounding each female contact assembly 38 or 40 and the copper bus 34, a semiconductive rubber insert corona protection layer 52. The cable splice 32 further includes resilient means surrounding the contact fingers 44 of each female contact assembly 38 and 40 for allowing the contact fingers and projections 46 to be moved radially outwardly upon insertion of the probe 18 into the female contact assembly 38, for exerting pressure on the contact fingers 44 in the radially inward direction to cause intimate contact between the contact fingers 44 and the probe 18, and for causing the projections 46 to recoil radially inwardly, after insertion of the probe 18 into the female contact assembly 38. In the preferred embodiment of the invention, the resilient means further provides a seal with the cable insulation 16 so as to resist the entry of dirt and moisture into the cable splice 32 and the formation of air voids between the cable insulation 16 and the cable splice 32. Preferably, the resilient means comprises insulating rubber 54 which surrounds the corona protection layer 52, and which is precision molded into the shape of a cable cone 56 at the ends of the cable splice 32. The cable cone 56 includes voltage grading and provides the seal with the cable insulation 16. During construction of the cable splice 32, the insulating rubber 54 may be molded while the copper bus 34 is in place. The splice 32 also comprises an outer layer 58 which is a molded semiconductive rubber layer formed of material similar to the semiconductive rubber insert corona protection layer. The outer layer 58 may include an integrally formed raised area or sprue 59 for a purpose that will later be explained.

Figure 2:
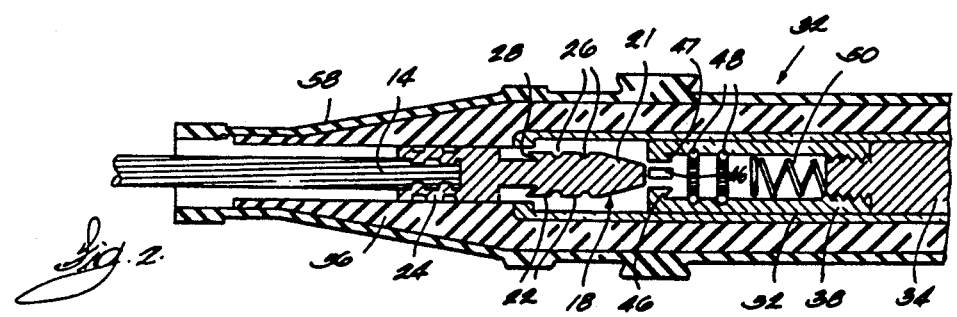
FIGS. 2–4 show the interaction of the components shown in FIG. 1 as the probe is inserted into the cable splice and before the probe is latched by the cable splice.

Referring now to FIG. 2, the probe 18 can be seen as having been inserted into an interface area 60 of the cable splice 32. The inner diameter of the interface area 60 is larger than the outer diameter of the probe 18, so that the interface area 60 is not prone to damage when the probe 18 is inserted into the cable splice 32. The forward tapered portion 21 of the probe 18 is shown positioned to push apart the projections 46 of the female contact assembly 38 of the cable splice 32 upon further insertion.

Figure 3:
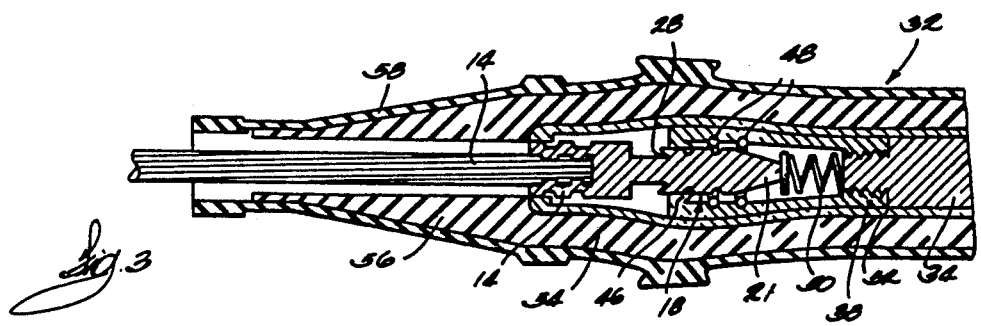

Referring now to FIG. 3, the probe 18 is shown as having been inserted into the cable splice 32 to a position where the forward tapered portion 21 of the probe has travelled past the projections 46 and has begun to compress the spring 50 of the splice 32. The contact surface 22 of the probe 18 exerts pressure on the contact fingers 44 in a radially outward direction, against pressure exerted by the insulating rubber 54.

Figure 4:
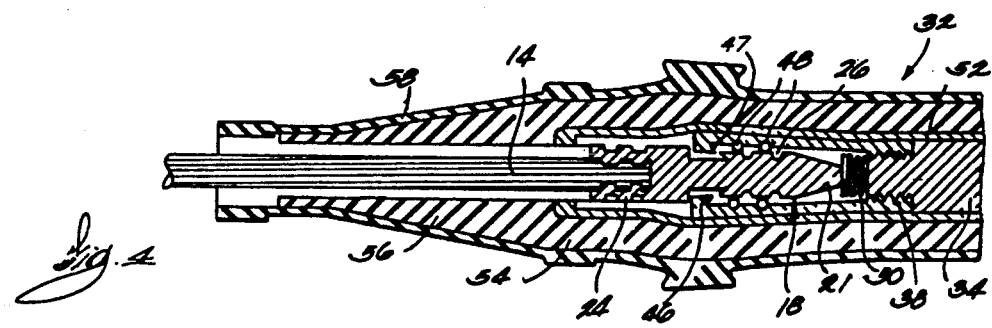

Referring now to FIG. 4, the probe 18 can be seen in a completely inserted position. The grooves 26 are positioned past the garter spring current interchanges 48 which the grooves 26 are meant to engage. The projections 46 are positioned radially outwardly of their normal position (shown in FIG. 2) due to the radially outward pressure exerted on the garter spring current interchanges 48 by the contact surface 22 of the probe 18. If the garter spring current interchanges 48 were omitted, the projections 46 would be displaced radially outwardly of their normal position due to radially outward pressure exerted directly on the projections 46 by the probe 18. The projections 46 would then return to their normal position after insertion of the probe 18, toward the bus 34, past the projections 46.

When force is no longer exerted on the probe 18 against the spring 50 of the splice 32, the garter spring current interchanges 48 will move into the grooves 26 of the probe 18 as the probe 18 moves axially outwardly in response to the force of the spring 50. Simultaneously, the undercut 28 of the probe 18 is engaged by the projections 46 of the female contact assembly 38 of the splice 32, thereby non-releasably locking the probe 18 into place. In other words, the probe 18 is biased into engagement with the surfaces 47 of the contact assembly 38 by the spring 50. The spring 50 further causes a positive contact pressure between the undercut 28 of the probe 18 and the surfaces 47 of the female contact assembly 38, which pressure tends to draw the contact fingers 44 radially inwardly so that contact pressure is also exerted between the contact portion 42 of the female contact assembly 38 and the contact surface 22 of the probe 18. Any additional force exerted on the probe 18 and in the direction of removal of the probe 18 from the cable splice 32 causes increased contact pressure and enhances electrical contact between the probe 18 and the female contact fingers 44.

FIG. 5 shows probes 18 and 20 locked into place in each end of the splice 32. As previously explained, the insulating rubber 54 exerts radially inward pressure which helps provide the seal with the cable insulation 16.

FIG. 6 shows an assembly mechanism 62 for drawing the cable end 12 having the probe 18 affixed thereto into the cable splice 32, through the positions shown in FIGS. 2-5. The mechanism 62 facilitates the insertion of the probe 18 into the cable splice 32 against the radially inward pressure exerted by the insulating rubber 54 of the cable splice 32. The mechanism includes a clamping assembly 64, a ratchet assembly 66, and an elongated, flexible member or cord or cable 68 for drawing the clamping assembly 64 toward the ratchet assembly 66. Both the ratchet assembly 66 and the clamping assembly 64 are comprised of two major halves which are held together with fasteners 70. In use, the two halves of the clamping assembly 64 are separated, and one of the cable end 12 and the cable splice 32 is clamped between the two halves of the clamping assembly 64. Similarly, the two halves of the ratchet assembly 66 are separated, and the other of the cable end 12 and the cable splice 32 is clamped between the two halves of the ratchet assembly 66. In the drawings, the clamping assembly 64 is shown clamping the cable end 12, and the ratchet assembly 66 is shown clamping the cable splice 32 and abutting the sprue 59 provided on the cable splice 32.

The ratchet assembly 66 includes a crank and pulley assembly 71 including a crank 72 and a ratchet 73 having thereon protrusions 74. Counterclockwise rotation of the crank 72 causes the clamping assembly 64 to be drawn toward the ratchet assembly 66 via the cable 68, thereby causing the probe 18 on the cable end 12 to move into the cable splice 32 to the position shown in FIG. 4. The ratchet assembly 66 further includes a pawl 76 which is biased in the counterclockwise direction (as shown in FIG. 6) and which engages the protrusions 74 of the ratchet assembly 66. After the position shown in FIG. 4 is attained, the pawl 76 is moved away from the protrusions 74, and the crank and pulley assembly 71 is allowed to turn in the clockwise direction, thereby allowing the probe 18 to be positively latched by the female contact assembly 38 of the cable splice 32 under the force of the spring 50.

Referring to FIG. 7, it can be seen that the position where the ratchet assembly 66 is clamped to the cable splice 32 is variable, and that the raised surface or sprue 59 formed in the outer layer 58 of the cable splice 32 is not required for operation of the assembly mechanism 62. Other configurations for the assembly mechanism 62 are also envisioned. For example, it is envisioned that a ratch mechanism similar to that of an auto jack could be used to draw the cable end 12 into the cable splice 32.

Shown in FIG. 8 is an alternative embodiment of the invention. A cable splice assembly or system 90 is shown in FIG. 8 which is generally identical to the cable splice assembly or system 10 shown in FIGS. 1-5, except that a female contact assembly 38 is provided on only one end of the bus 34, with the other end of the bus 34 having a cable crimp 92 for crimping a cable end. In this embodiment the bus 34 and the crimp 92 are telescopically slideable from the cable cone 56 so that the cable end can be crimped by the crimp 92, resulting in the configuration illustrated in FIG. 8.

Shown in FIG. 9 is another alternative embodiment of the invention. The cable splice assembly or system 100 shown in FIG. 9 is generally identical to the cable splice or system 10 shown in FIGS. 1-5, except that the contact assemblies 38 and 40 (not shown) are integrally formed with the bus 34.

Various of the features of the invention are set forth in the following claims.

I claim:

1. A process for electrically connecting an end of a power cable to the female contact assembly of a cable splice, said process comprising the steps of:
   electrically connecting a probe to the end of the power cable; and
   inserting said probe into the female contact assembly of the cable splice, said step of inserting said probe into the female contact assembly of the cable splice comprising providing a mechanism for pulling said probe toward the splice, attaching said mechanism to the cable end and to the cable splice with said probe in position for engagement with the female contact assembly, and causing said mechanism to pull said probe towards the splice so that said probe is inserted into the female contact assembly.

2. A process in accordance with claim 1 wherein said mechanism comprises a clamping assembly attached to one of said cable end and said cable splice and a ratchet assembly attached to the other of said cable end and said cable splice, and wherein said ratchet assembly is manipulated to cause said clamping assembly to be drawn towards said ratchet assembly thereby causing said probe to be inserted into said female contact assembly.

3. A process for electrically connecting an end of a power cable to the female contact assembly of a cable splice, said process comprising the steps of:
   electrically connecting a probe to the end of the power cable;
   providing a mechanism for pulling said probe toward the splice, said mechanism including a clamping assembly attached to one of said cable end and said cable splice and a ratchet assembly attached to the other of said cable end and said cable splice;
   attaching said mechanism to the cable end and to the cable splice with said probe in position for engagement with the female contact assembly; and
   manipulating said ratchet assembly to cause said mechanism to pull said probe towards the splice so that said probe is inserted into the female contact assembly.

4. A process for electrically connecting an end of a power cable to the female contact assembly of a cable splice, said process comprising the steps of:
   electrically connecting a probe to the end of the power cable;
   providing a mechanism for pulling said probe toward the splice, said mechanism including a clamping assembly, and a ratchet assembly including a ratchet, a crank for causing rotation of said ratchet, and selectively operable pawl means for preventing rotation of said ratchet in a first direction, said mechanism further including an elongated flexible member that extends between said clamping assembly and said ratchet and that draws said clamping assembly toward said ratchet assembly upon rotation of said crank in a second direction opposite to said first direction;
   attaching said clamping assembly to one of the cable end and the cable splice and attaching said ratchet assembly to the other of the cable end and the cable splice with said probe in position for engagement with the female contact assembly; and
   rotating said crank in said second direction to cause said mechanism to pull said probe towards the splice so that said probe is inserted into the female contact assembly.

* * * * *